(12) United States Patent
Pan

(10) Patent No.: US 6,561,217 B1
(45) Date of Patent: May 13, 2003

(54) ROTARY MIXING SOLENOID VALVE FOR TEMPERATURE-CONTROL

(76) Inventor: Zhaokeng Pan, No. 8-404, Renmin Rd, Foshan City, Guangdong Province, 528000, P.R. (CN)

( * ) Notice: Subject to any disclaimer, the term of this patent is extended or adjusted under 35 U.S.C. 154(b) by 0 days.

(21) Appl. No.: 09/830,534
(22) PCT Filed: Oct. 28, 1999
(86) PCT No.: PCT/CN99/00172
§ 371 (c)(1),
(2), (4) Date: Jun. 14, 2001
(87) PCT Pub. No.: WO00/26568
PCT Pub. Date: May 11, 2000

(51) Int. Cl.$^7$ ............................ F16K 31/02; G05D 23/13
(52) U.S. Cl. ................. 137/487.5; 137/88; 137/625.41; 236/12.12; 251/313
(58) Field of Search ............................ 137/88, 625.41, 137/487.5; 236/12.12; 251/129.11, 313

(56) References Cited

U.S. PATENT DOCUMENTS

| 2,225,210 A | * | 12/1940 | Dillon .................. 137/625.41 |
| 3,442,287 A | | 5/1969 | Ray |
| 3,721,386 A | * | 3/1973 | Brick et al. ............ 137/625.41 |
| 3,864,031 A | | 2/1975 | Hossfeld et al. |
| 4,842,191 A | * | 6/1989 | Bergmann ............... 236/12.12 |
| 4,974,636 A | * | 12/1990 | Cogger .................. 236/12.12 |
| 5,271,601 A | | 12/1993 | Bonzer et al. |
| 6,129,106 A | * | 10/2000 | Kornelson et al. ..... 137/625.41 |

FOREIGN PATENT DOCUMENTS

| CN | 1041210 | 4/1990 |
| CN | 2186832 | 1/1995 |
| EP | 364898 | 4/1990 |
| EP | 621424 | 10/1994 |
| WO | WO 97/27524 | * 7/1997 |

OTHER PUBLICATIONS

Derwent Patent Abstract, AU 8824–775.

* cited by examiner

Primary Examiner—Michael Powell Buiz
Assistant Examiner—Ramesh Krishnamurthy
(74) Attorney, Agent, or Firm—Merchant & Gould P.C.

(57) ABSTRACT

A rotary liquid mixing solenoid valve comprises a valve casing, a cold and/or hot water inletpipes, a mixed water outlet pipe, a temperature sensor installed in the mixed water outlet pipe, and a guardless rotary electromagnet mounted on a side of the valve casing. Both side faces of a regulating block mounted on an epitaxial end of a rotary armature shaft of the electromagnet may fit with the end faces of cold, hot liquid inlet openings respectively. After a coil is energized, the regulating block causes the temperature of mixed liquid to be stable via regulating the flow of cold, hot liquids in proportion according to a preset temperature. The valve has the advantages as follows: e.g. a simple structure, a miniature volume, a small power consumption, a high working efficiency, a fast regulating response, a high accuracy, and a stable and reliable operation, etc.

5 Claims, 1 Drawing Sheet

ROTARY MIXING SOLENOID VALVE FOR TEMPERATURE-CONTROL

TECHNICAL FIELD

The invention relates to a valve for liquid temperature regulation, more particularly to a rotary liquid mixing solenoid valve which can control the mixed liquid temperature via a random adjustment of the mixed ratio of liquids having different temperatures.

BACKGROUND ART

Current liquid mixed regulating valves are generally used for the water temperature regulation, in which there is a manual-operated mixed regulating valve, with its cold and hot water pipes being connected to the valve body. The mixed ratio of cold and hot water can be regulated by way of a manual operation to regulate the outlet water temperature. The deficiencies of this method lie in: on one hand regulating accuracy is insufficient; on the other hand, when the inlet water temperature varies, the manual regulation should be carried out increasingly to ensure the outlet water temperature approaching a setting value. Furthermore, a number of the automatically mixed regulating valves generally regulate the mixed ratio of cold and hot water by way of bimetallic elements, memory metals or liquid expansion structures which are not only working as sensing elements, but also as executive elements so as to result many problems of an inconvenient regulation, a slow response, an insufficient regulation accuracy. Furthermore, since the predetermined temperature of the valve body cannot be varied by the quantity of electricity, it is rather difficult as for this kind of mixed regulating valves to perform an automatic control in collaboration with its peripheral units and to guarantee a long term stable work and a longer service life.

DISCLOSURE OF THE INVENTION

An object of the invention is to provide a rotary liquid mixing solenoid valve for temperature regulation, in which not only the predetermined temperature of mixed liquid may be varied continuously via the change of the quantity of electricity, but also has the features of a fast regulation, a high accuracy, and a stable operation.

Another object of the invention is to provide a rotary liquid mixing solenoid valve having a simple structure, a miniaturized volume, a small power consumption, and a high working efficiency.

The rotary liquid mixing solenoid valve provided by the invention comprises a valve casing, a cold liquid inlet pipe, a hot liquid inlet pipe and a mixed liquid outlet pipe installed therein, a temperature sensing element and a control circuit disposed in the outlet pipe, a guardless rotary electromagnet rigidly mounted on a side of valve casing for control of the ratio of cold and hot liquids, a regulating block fastened on an epitaxial end of rotary armature shaft of the electromagnet, the regulating block being located between the end faces of inlet openings of cold and hot liquids, the block rotating in pace with the armature shaft, both side faces thereof capable of fitting with the end faces of inlet openings flowing cold and hot liquids in the inner cavity of valve casing respectively, either performing swinging at any angle or residing between the both end faces, the armature shaft being installed in a positioning hole of bearing case, and a rubber sealing ring being mounted thereon. A reset spring is mounted on said guardless rotary electromagnet, one end thereof being fastened on the iron core or valve support, another end thereof being mounted on a side of the rotary armature or an arm secured on the epitaxial end of the armature shaft. A regulating screw is installed on one end of the reset spring, for revision of the systemic error generated from various factors.

BRIEF DESCRIPTION OF DRAWINGS

Incorporating with the drawings, a preferred embodiment shall be described in detail as follows, in which.

OPTIMUM REALIZATION MODE OF THE INVENTION

Figure 1:
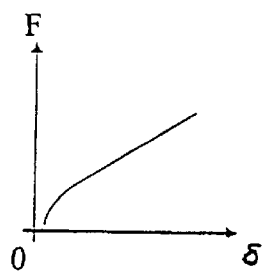
FIG. 1 is a attraction force characteristics of the guardless rotary electromagnet, in which F represents the attraction force, δ represents the armature stroke, and the terminal point of an attraction operation is O.
Figure 2:
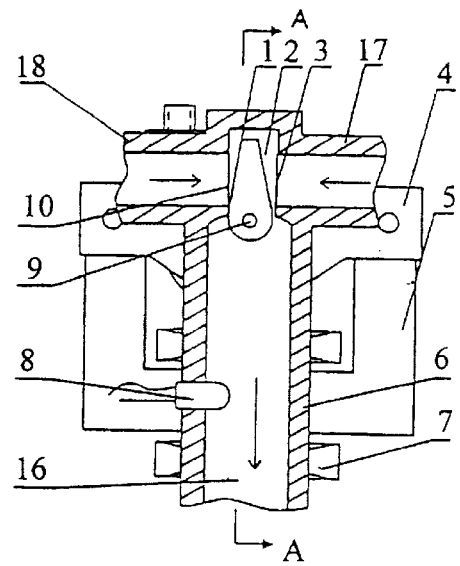
FIG. 2 is a structural schematic of an embodiment of the invention.
Figure 3:
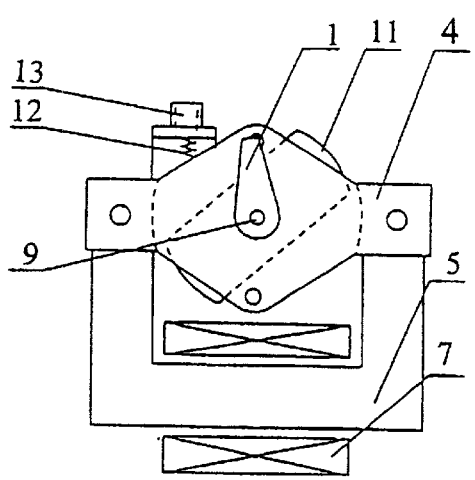
FIG. 3 is a structural schematic of the guardless rotary electromagnet with the valve casing and temperature sensing element removed.
Figure 4:
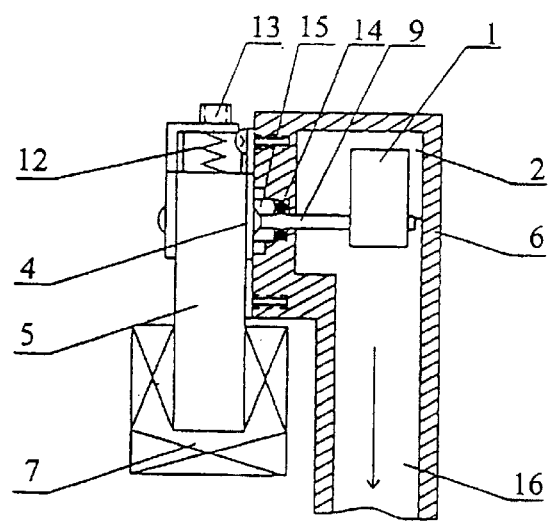
FIG. 4 is an A—A sectional view of valve casing shown in FIG. 2.

Referring to FIGS. 5 2,3, and 4, the rotary liquid mixing solenoid valve of the invention is applied in a water heater, its temperature regulated liquid is water, the valve comprises a valve casing 6, a temperature sensing element 8 and a control circuit mounted on a mixed liquid outlet pipe in the inner chamber 2 of the valve casing, and a guardless rotary electromagnet mounted on a side of valve casing 6.

Cold water inlet pipe 17, hot water inlet pipe 18 and mixed water outlet pipe 16 are installed in the inner chamber 2 of valve casing 6, a positioning hole of bearing case 15 of the armature shaft being opened on a side face of the valve casing 6, the bearing case 15 of the electromagnet shaft and the epitaxial portion of shaft 9 being mounted and located thereon, and a rubber sealing ring 14 being mounted on shaft 9 in the positioning hole. The guardless rotary electromagnet is fastened on a side face of the valve casing 6 via its iron core 5 and valve support 4, the reset spring 12 is installed between its rotary armature 11 and the valve support 4, and a regulating screw 13 is also mounted on the reset spring 12. The regulating block1 is mounted on the epitaxial end of the rotating shaft 9, the regulating block 1 is located between the end face 3 of the cold water inlet opening and the end face 10 of the hot water inlet opening, regulating block1 rotates following the rotating shaft 9, both side faces thereof may be fitted on the end face 3 of the cold water inlet opening and the end face 10 of the hot water inlet opening respectively, which are the states of starting and terminal points of regulating block 1, respectively. In the case of the guardless rotary electromagnet being de-energized, due to the action of the reset spring 12, a side face of the regulating block 1 shall be fitted on the end face 3 of the cold liquid inlet opening or the end face 10 of hot liquid inlet opening. After the control circuit had been energized, the output electric signal from the temperature sensing element 8 installed in the mixed liquid outlet pipe is compared with the predetermined voltage of a preset temperature, a controllable quantity of electricity is output to a coil 7, the electromagnet operates, the regulating block 1 swings with any angle or resides between the end faces 3,10 of the cold, hot water inlet openings, i.e. the magnitude of the current in the electromagnet coil is varied to adjust the swinging of the block between the end faces of above mentioned cold, hot inlet openings, flow of cold, hot water being regulated in proportion, and the temperature of mixed water draining from the mixed water outlet pipe is defined within the scope of preset temperature.

The guardless rotary electromagnet comprises an iron core 5, a coil 7 and a rotary armature 11, in which the rotary armature 11 is sustained on the valve support 4 fastened on iron core 5 via the rotating shaft 9 and the bearing, and equidistant clearances occurred between both side end faces of armature 11 and the corresponding side faces of the iron core 5, so as to attained the features of a flat attraction characteristics, a large initial attraction force, to be able to conveniently vary the coil current, adjust the operation stroke, and conduct quasi linear continues regulation. Cf. the curve in FIG. 1 for reference.

INDUSTRIAL APPLICABILITY

The guardless rotary electromagnet is employed in the invention, in which the sensing elements are separated from the executive elements so as to vary the preset temperature by way of changing of the quantity of electricity. In contrast with the prior art, the invention has the advantages of a fast regulating response, a high accuracy, a stable and reliable operation, and automatic control may be carried out in collaboration with the peripheral units etc.

What is claimed is:

1. A rotary liquid mixing solenoid valve, comprising a valve casing and a cold liquid inlet pipe, a hot liquid inlet pipe and an outlet pipe of mixed liquid installed therein, a temperature sensing element and a control circuit installed in said outlet pipe, wherein, a guardless rotary electromagnet controlling the ratio of cold and hot liquids is fastened on a side of said valve casing, a regulating block being fastened on an epitaxial end of a rotating shaft of an armature of said guardless rotary electromagnet, said regulating block being located between an end face of an opening of said hot liquid inlet pipe and an end face of an opening of the said cold liquid inlet pipe, said regulating block rotating following said rotating shaft, making its both side faces fitting with said end faces of the openings of said cold and hot liquid inlet pipes, said openings located in an inner chamber of said valve casing, and said regulating block being able to swing or reside at any angle between both said end faces, said rotating shaft being installed in a bearing case in a positioning hole on said valve, and a rubber sealing ring being mounted thereon.

2. Said liquid mixing solenoid valve according to claim 1, wherein, a reset spring is mounted on said guardless rotary electromagnet, one end thereof being fastened on a iron core or a valve support, another end being fastened on an arm fastened at a side of said armature or the epitaxial portion of said rotating shaft.

3. Said liquid mixing solenoid valve according to claim 2 wherein a regulating screw is installed on one end of said reset spring.

4. A rotary liquid mixing solenoid valve, comprising a valve casing and a cold liquid inlet pipe, a hot liquid inlet pipe and an outlet pipe of mixed liquid installed therein, a temperature sensing element and a control circuit installed in said outlet pipe, wherein, a guardless rotary electromagnet controlling the ratio of cold and hot liquids is fastened on a side of said valve casing, a regulating block being fastened on an epitaxial end of a rotating shaft of an armature of said guardless rotary electromagnet, said regulating block being located between an end face of an opening of said hot liquid inlet pipe and an end face of an opening of said cold liquid inlet pipe, said regulating block rotating following said rotating shaft, making its both side faces fitting with said end faces of the openings of said cold and hot liquid inlet pipes, said openings located in an inner chamber of said valve casing, and said regulating block being able to swing or reside at any angle between both said end faces, said rotating shaft being installed in a bearing case in a positioning hole on said valve, and a rubber sealing ring being mounted thereon; and a reset spring is mounted on said guardless rotary electromagnet, one end thereof being fastened on an iron core or a valve support, another end being fastened on an arm fastened at a side of said armature or the epitaxial end of said rotating shaft.

5. Said liquid mixing solenoid valve according to claim 4, wherein, a regulating screw is installed on an end of said reset spring.

* * * * *